(12) United States Patent
Lee

(10) Patent No.: US 11,011,067 B2
(45) Date of Patent: May 18, 2021

(54) SHADOW FAIRYTALE PROJECTOR

(71) Applicant: DooDooSTORY Co., Ltd., Seoul (KR)

(72) Inventor: Nam Jin Lee, Seoul (KR)

(73) Assignee: DOODOO STORY CO., LTD., Seoul (KR)

( * ) Notice: Subject to any disclaimer, the term of this patent is extended or adjusted under 35 U.S.C. 154(b) by 353 days.

(21) Appl. No.: 16/242,423

(22) Filed: Jan. 8, 2019

(65) Prior Publication Data

US 2020/0090535 A1   Mar. 19, 2020

(30) Foreign Application Priority Data

Sep. 19, 2018  (KR) .......................... 10-2018-0112033

(51) Int. Cl.
| | | |
|---|---|---|
| *G03B 21/00* | (2006.01) | |
| *G09B 5/06* | (2006.01) | |
| *G02B 27/18* | (2006.01) | |

(52) U.S. Cl.
CPC ............. *G09B 5/067* (2013.01); *G02B 27/18* (2013.01)

(58) Field of Classification Search
CPC ...... G09B 5/067; G02B 27/17; H04N 9/3161; G03B 21/204; G03B 21/208; G03B 21/2013; G03B 21/005; G03B 21/008; G03B 21/2066; G03B 21/142; G03B 21/2033; G03B 21/00; G03B 21/145; G03B 17/54; G03B 21/001
See application file for complete search history.

(56) References Cited

U.S. PATENT DOCUMENTS

| | | | | |
|---|---|---|---|---|
| 5,733,033 | A * | 3/1998 | Coleman | A23G 3/563 362/109 |
| 6,402,326 | B1 * | 6/2002 | Bortz | G03B 21/16 353/103 |
| 6,623,124 | B2 * | 9/2003 | Okura | G03B 21/14 353/101 |
| 10,146,120 | B1 * | 12/2018 | Zhang | G03B 21/43 |
| 2002/0071100 | A1 * | 6/2002 | Meng-Suen | G03B 23/00 353/25 |
| 2008/0277302 | A1 * | 11/2008 | Yoon | B65D 81/365 206/457 |
| 2016/0081371 | A1 * | 3/2016 | Saha | A23L 29/238 426/104 |

FOREIGN PATENT DOCUMENTS

KR   20160055452   5/2016

\* cited by examiner

*Primary Examiner* — Justin S Lee
(74) *Attorney, Agent, or Firm* — IPLA P.A.

(57) ABSTRACT

A shadow fairytale projector for providing images of a fairytale, comprises: a head part having a first lens module which protrudes from an outer side surface; a slit part where a perforated hole overlapping with the first lens module is formed, where the slit part comprises a first engagement rotation module for rotating a pack inserted into the pack slit and a film formed inside the pack, a fixing protrusion module for fixing the pack, and a discriminant protrusion module; and a body part which comprises a drive module connected to the first engagement rotation module to drive the first engagement rotation module, a control module, a speaker module connected to the control module to receive the sound signal and generate sound, and a battery for applying electrical energy to the drive module, the control module, and the speaker module.

6 Claims, 5 Drawing Sheets

SHADOW FAIRYTALE PROJECTOR

CROSS REFERENCE

This application claims foreign priority under Paris Convention to Korean Patent Application No. 10-2018-0112033, filed 19 Sep. 2018, with the Korean Intellectual Property Office, entire of which is incorporated herein by reference.

BACKGROUND

The present invention relates to a technology of toys for children. Thus, the present invention pertains to the field of toys.

A fairytale helps children enhance the capability to use their imagination and widen their understanding. In the past, three-dimensional children book having moving pictures were developed and became common. That is, three-dimensional books like a book disclosed in Korean Patent Application Publication No. 10-2016-0055452 were made.

Nowadays, such three-dimensional books have been developed into sound books which provide sound of pictures included in the books. The sound books have been gaining popularity in that children is able to feel pictures in a book three-dimensionally.

With the popularity of sound books, more and more parents are looking for a device which reads a fairytale and shows scenes thereof and furthermore explains each of the scenes.

SUMMARY OF THE INVENTION

The present invention aims to meet currently increasing demands, and provides a shadow fairytale projector that shows scenes of a fairytale like a movie and explains the story rhythmically.

Objects of the present invention should not be limited to the aforementioned objects and other unmentioned objects will be clearly understood by those skilled in the art from the following description.

In order to achieve the above object, the present invention provides a shadow fairytale projector including: a head part having a first lens module which protrudes from an outer side surface;

a slit part where a perforated hole overlapping with the first lens module is formed, and where at least one pack slit connected to the head part is formed on at least one side surface of the slit part, wherein the slit part comprises a first engagement rotation module for rotating a pack inserted into the pack slit and a film formed inside the pack, a fixing protrusion module for fixing the pack, and a discriminant protrusion module for determining a type of the pack; and a body part which comprises a drive module connected to the first engagement rotation module to drive the first engagement rotation module, a control module coupled to the discriminant protrusion module to generate a pack discriminant signal and generate a sound signal in response to rotation of the drive module, a speaker module connected to the control module to receive the sound signal and generate sound, and a battery for applying electrical energy to the drive module, the control module, and the speaker module.

The pack may include a second pinion gear to be coupled to the first engagement rotation module, and the first engagement rotation module may be a first pinion to be engaged with the second pinion gear.

The discriminant groove may be formed in a plurality of shapes, and the control module may generate different pack discriminant signals in response to the shapes of the discriminant groove.

The pack may include a circular edge portion and a film attached to the edge portion, and a circumferential surface of the edge portion is formed as the second pinion.

A fixing groove for housing the fixing protrusion module and a discriminant groove for housing the discriminant protrusion module may be formed in one surface of the pack.

The fixing groove may have an upper end which is partially opened to expose the edge portion.

The control module may be connected to the fixing protrusion module, the discriminant protrusion module, and the drive module so as to drive the drive module by generating different electrical signals in response to operations of the fixing protrusion module and the discriminant protrusion module, computing the different electrical signals, and applying the computed electrical signals to the drive module.

DETAILED DESCRIPTION OF THE INVENTION

Figure 1:
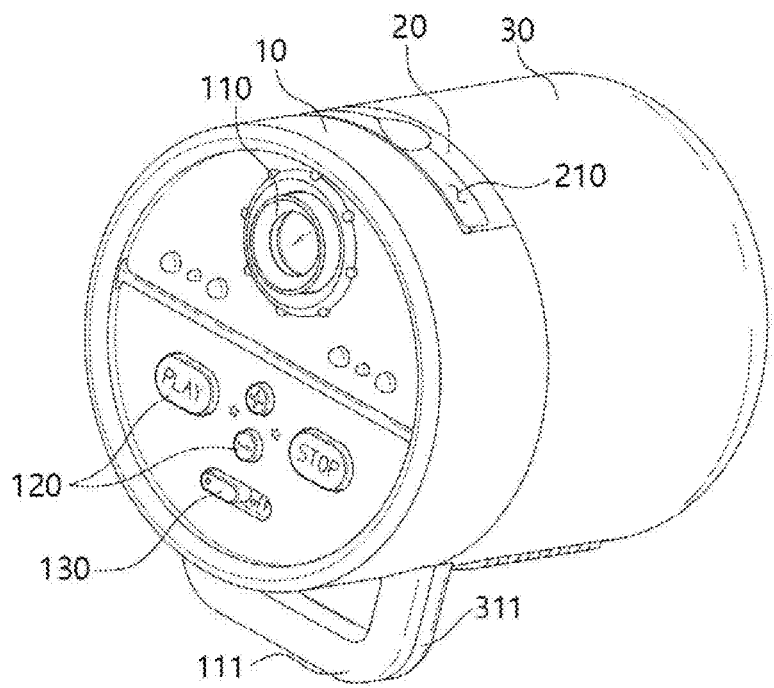
FIG. 1 is a perspective view of a shadow fairytale projector according to an embodiment of the present invention.

Hereinafter, embodiments of the present invention will be described in detail with reference to the accompanying drawings.

The present invention is described more fully hereinafter with reference to the accompanying drawings, in which example embodiments of the present invention are shown. The present invention may, however, be embodied in many different forms and should not be construed as limited to the example embodiments set forth herein.

Rather, these example embodiments are provided so that this disclosure will be thorough and complete, and will fully convey the scope of the present invention to those skilled in the art. In the drawings, like numbers refer to like elements. In addition, the present invention is defined only by the scope of the claims.

Hereinafter, description is provided with reference to the accompanying drawings which illustrates preferred embodiments of the present invention.

First, a shadow fairytale projector according to an embodiment of the present invention will be described schematically with reference to FIG. 1.

FIG. 1 is a perspective view of a shadow fairytale projector according to an embodiment of the present invention.

A shadow fairytale projector 1 shows scenes of a fairytale, like a movie, and outputs a story relating to each scene. In this case, when a power module is turned on, the shadow fairytale projector 1 may automatically drive packs 40-1 to 40-6 inserted into a pack slit 210 and play images stored in the packs by projecting the images onto a wall or a ceiling for about 150 seconds.

In particular, together with the images, the shadow fairytale projector 1 may rhythmically provide onomatopoeia effects and mimetic word effects, which are not available in general picture books. The shadow fairytale projector 1 three-dimensionally provides stories of pictures so as to help children understand the fairytale more easily. Furthermore, the shadow fairytale projector 1 may provide images in the form of shadow so as to help the children fall asleep while seeing the images.

The shadow fairytale projector 1 includes a head part 10, a slit part 20, a body part 30, and the packs 40-1 to 40-6 (see FIG. 2) including a fairytale film. In addition, the shadow fairytale projector 1 may further include a first holding module 111 projected from the head part 10, and a second holding module 311 projected from the body part 30.

Hereinafter, components of the shadow fairytale projector will be described with reference to FIG. 2 as well as FIG. 1.

Figure 2:
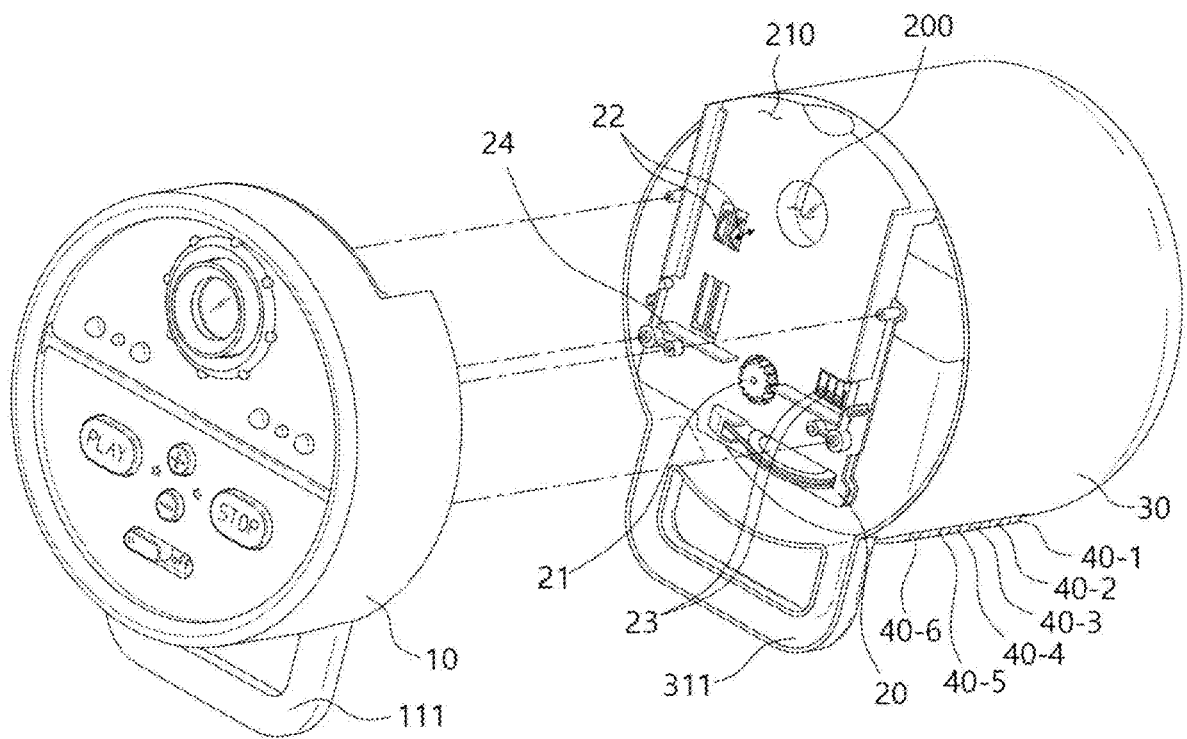
FIG. 2 is an exploded perspective view of a shadow fairytale projector according to an embodiment of the present invention.

FIG. 2 is an exploded perspective view of a shadow fairytale projector according to an embodiment of the present invention.

The head part 10 is a front-end part of the present invention coupled to the slit part 20 and the body part 30. A first lens module 110 is formed on an outer side surface of the head part 10 and projected outward. In addition, a plurality of button modules 120 and a power module 130 are formed. Here, the first lens module 110 includes a lens that enlarges a picture painted on a pack. One end of the first lens module 110 may be projected from the outer side surface of the head part 10, and the other end thereof may be inserted into a perforated hole 200 of the slit part 20.

In addition, the button modules 120 may be a play button for driving rotation of a first engagement rotation module 21 formed in the slit part 20, a stop button for stopping rotation of the first engagement rotation module 21, a volume control button for controlling a volume of output sound of the speaker module, etc. In addition, the power module 130 may be a switch for controlling a current path between a control module 300 and a battery 320 which are installed in the body part 30.

The slit part 20 is disposed between the head part 10 and the body part 30. One surface of the slit part 20 may be connected and fixed to the body part 30, and the other surface thereof may be connected to the head part 10 to thereby form the pack slit 210.

The slit part 20 may house any one of the plurality of packs 40-1 to 40-6 in the pack slit 210. For example, the slit part 20 may house the first pack 40-1 in the pack slit 210.

On the other surface of the slit part 20, the perforated hole 200 overlapping with the other end of the first lens module 110 is formed. In addition, a fixing protrusion module 22 for fixing positions of the packs 40-1 to 40-6 inserted into the pack slit 210, and a discriminant protrusion module 23 for determining a type of an inserted pack are included. In addition, a pack supporting module 24 may protrude in a direction vertical to a direction in which a pack is inserted, such that the pack supporting module 24 supports the packs 40-1 to 40-6. In addition, the other surface of the slit 20 includes the first engagement rotation module 21 for rotating films of the packs 40-1 to 40-6 inserted into the slit part 20.

The body part 30 is a rear-end part of the present invention, which is coupled to the head part 10. The body part 30 may include a pack house formed therein, and house the plurality of packs 40-1 to 40-6 in the pack house.

In addition, the body part 30 includes a drive module 330 (see FIG. 6) connected to the first engagement rotation module 21 to drive the first engagement rotation module 21, the control module 300 (see FIG. 6) coupled to the discriminant protrusion module 23 to generate a pack discriminant signal and generate a sound signal in response to rotation of the drive module 330, a speaker module 310 (see FIG. 6) connected to the control module 300 to generate sound by receiving the sound signal, and the battery 320 (see FIG. 6) serving to apply electrical energy to the drive module 330, the control module 300, and the speaker module 310.

Hereinafter, with reference to FIGS. 3 and 4, a state in which a pack is coupled to the pack slit, and a state in which a film of a pack is rotated by the first engagement rotation module are described.

Figure 3:
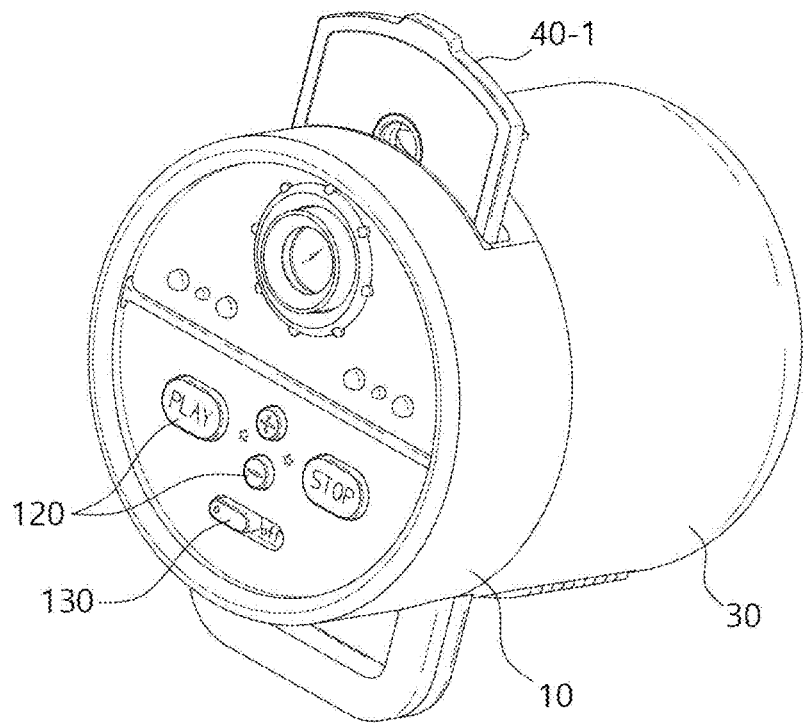
FIG. 3 is a diagram illustrating a state in which a pack is coupled to the pack slit shown in FIG. 1.
Figure 4:
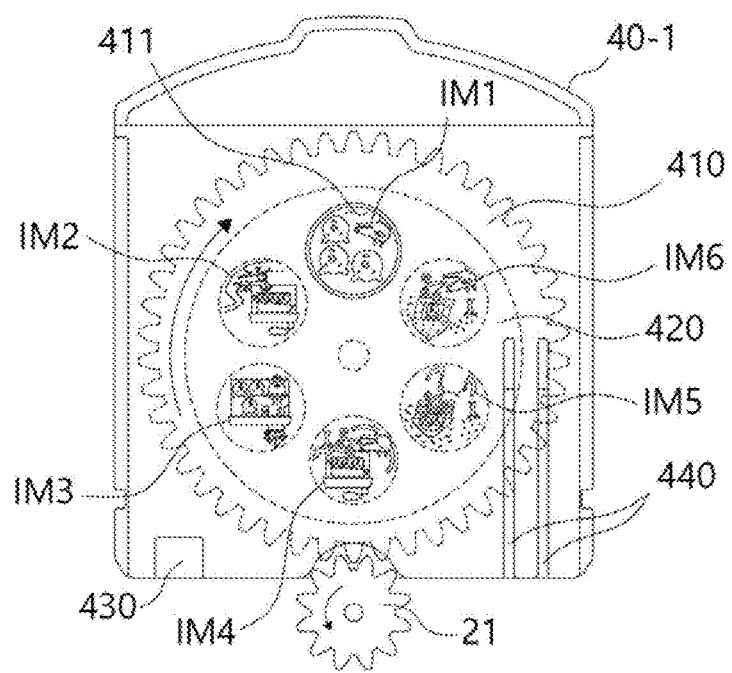
FIG. 4 is a diagram illustrating a state in which an edge portion of a pack and the first engagement rotation module are engaged with each other such that a film of the pack is rotated.
Figure 5A:
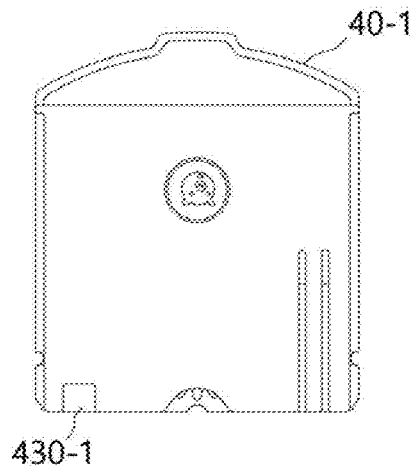
FIG. 5a~5f are diagrams illustrating various embodiments of a pack coupled to the pack slit illustrated in FIG. 1.
Figure 5B:
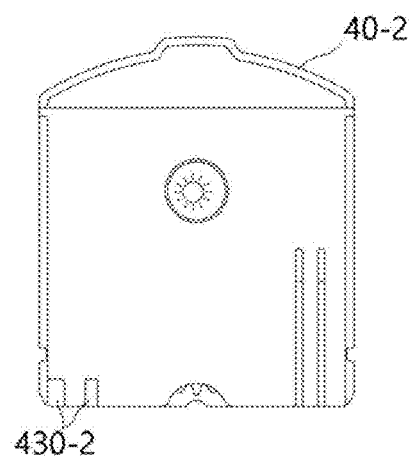
Figure 5C:
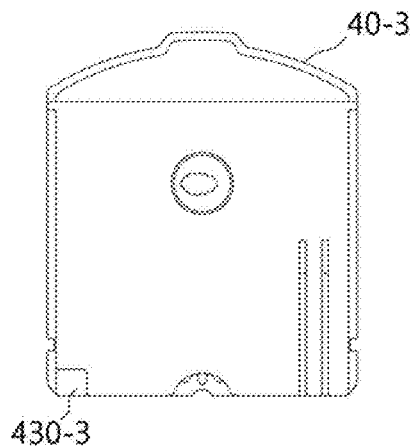
Figure 5D:
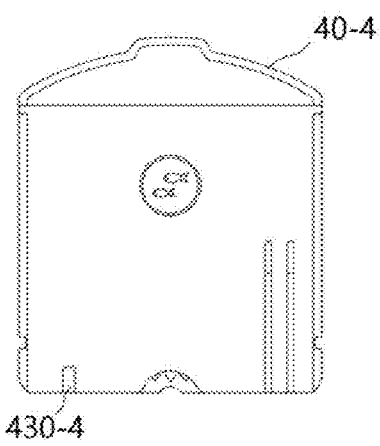
Figure 5E:
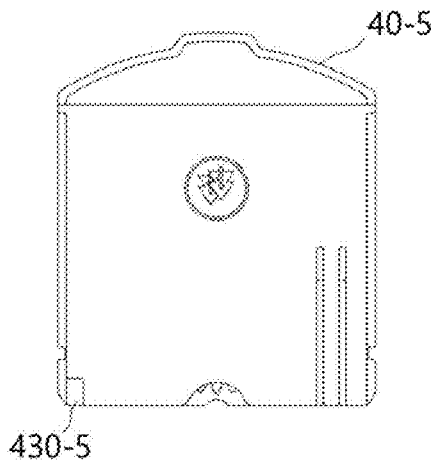
Figure 5F:
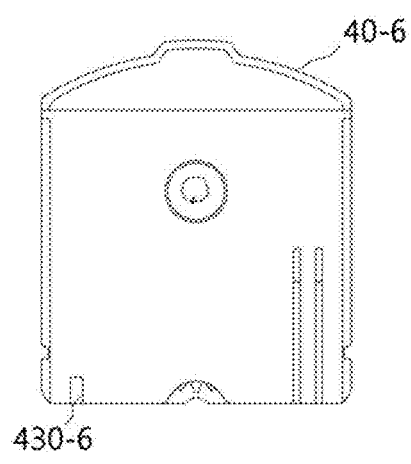

FIG. 3 is a diagram illustrating a state in which a pack is coupled to the pack slit shown in FIG. 1, and FIG. 4 is a diagram illustrating a state in which an edge portion of a pack and the first engagement rotation module are engaged with each other such that a film of the pack is rotated.

A user may insert any one of a plurality of packs housed in the pack house into the slit part 20. Each of the plurality of packs may be formed with a rectangular lower end and a triangular upper end. A hole is formed on one surface of the rectangular lower end, such that a film 420 inserted inside is viewed through the hole. The film 420 may contain six scenes of a fairytale story. An image hole 411 may expose each scene to an outside.

First to sixth packs 40-1 to 40-6 may be inserted into the slit part 20 by moving downward from above the slit part 20 until touching the pack supporting module 24. In this case, each of the first to sixth packs 40-1 to 40-6 may be fixed to the slit part 20 in a manner in which a fixing groove 440 formed on one surface thereof is coupled to the fixing protrusion module 22 formed in the slit part 20.

Each of the packs 40-1 to 40-6 may have a film attached therein, and the edge portion 410 whose outer circumferential surface is formed as a pinion gear. Here, the pinion gear may be a second pinion gear that is to be engaged with the first engagement module which is a first pinion gear.

The edge portion 410 may be engaged with the first pinion gear and rotated in a direction opposite to a direction in which the first pinion gear is rotated. When the first pinion gear is rotated in a counter-clockwise direction, the edge portion 410 may be rotated in a clockwise direction such that a picture painted on the film is exposed through the hole. In this case, the first engagement rotation module 21 is driven by the control module 300, thereby rotating the edge portion 410. In this case, one round of operation of the first engagement module 21 allows one scene printed on the film 420 to overlap with the image hole 411. Due to rotation of the edge portion 410 operating in engagement with the first engagement rotation module 21, six scenes printed on the film 420 may be sequentially exposed through the image hole 411.

More specifically, the control module 300 is connected to the fixing protrusion module 22 and the discriminant protrusion module 23, and drives the drive module 330 by computing an electrical signal applied from each module.

When a pack is inserted into the pack slit 210, the control module 300 may drive the first engagement rotation module 25 such that a first scene IM1 among six scenes printed on the film 420 of the inserted pack is exposed through the image hole 411.

After driving the first engagement rotation module 21 in an initial state, the control module 300 may maintain the first engagement rotation module 21 to be stopped from the $1^{st}$ second to the $25^{th}$ second such that the first scene IM1 of the film 420 of the pack inserted into the pack slit 210 is exposed through the image hole 411. Then, the control module 300 may rotate the first engagement rotation module 21 by a predetermined amount in the counter-clockwise direction such that a second scene IM2 formed on the film 420 overlaps with the image hole 411, and the control module 300 may maintain the first engagement rotation module 21 to be stopped from the $26^{th}$ second to the $50^{th}$ second such that the second scene IM2 is exposed through the image hole 411.

Then, the control module 300 may rotate the first engagement rotation module 21 by a predetermined amount in the counter-clockwise direction such that a third scene IM3 printed on the film 420 overlaps with the image hole 411, and the control module 300 may maintain the first engagement rotation module 21 to be stopped from the $51^{st}$ second to the 57th second such that the third scene IM3 is exposed through the image hole 411.

Then, the control module 300 may rotate the first engagement rotation module 21 by a predetermined amount in the counter-clockwise direction such that a fourth scene IM4 printed on the film 420 overlaps with the image hole 411, and the control module 300 may maintain the first engagement rotation module 21 to be stopped from the $76^{th}$ second to the $100^{th}$ second such that the fourth scene IM4 is exposed through the image hole 411.

Then, the control module 300 may rotate the first engagement rotation module 21 by a predetermined amount in the counter-clockwise direction such that a fifth scene IM5 overlaps with the image hole 411, and the control module 300 may maintain the first engagement rotation module 21 to be stopped for the $101^{st}$ second to the $125^{th}$ second such that the fifth image IM5 is exposed through the image hole 411.

Then, the control module 300 may rotate the first engagement rotation module 21 by a predetermined amount in the counter-clockwise direction such that a sixth scene IM6 overlaps with the image hole 411, and the control module 300 may maintain the first engagement rotation module 21 to be stopped from the $126^{th}$ second to the $150^{th}$ second such that the sixth image IM6 is exposed through the image hole 411.

As such, the control module 300 may cause each scene to be exposed through the image hole 411 for 25 seconds using the first engagement rotation module 21, such that the entire images of the film, that is, the sixth scenes may be played for 150 seconds. Driving the first engagement rotation module 21a and stopping the same for a predetermined period of time by the control module 300 are performed automatically when the power module 130 is turned on.

In addition, when a new pack is inserted into the pack slit 210, that is, when an electrical signal applied from the fixing protrusion module and the determinant protrusion module switches from a turn-off state to a turn-on state, the control module 300 may drive the first engagement rotation module 25 such that the first scene IM1 of the film 420 of the pack is exposed through the image hole 411. Accordingly, the control module 300 performs control such that the first scene of the film 420 is played through the image hole 411 even in the case where a pack is inserted again into the pack slit 210 after a part or whole of contents the pack was already played upon insertion into the pack slit 210.

In addition, such an operation may be changed by a program preset in the control module 300.

A pack may be packs having different image films. For example, a pack may be the first to sixth pack 40-1 to 40-6 having different image films.

Here, the first pack 40-1 may be a pack having a film of the fairytale "Three Little Pigs", the second pack 40-2 may be a pack having a film of the fairytale "Ugly Duck", the third pack 40-3 may be a pack having a film of the fairytale "Red Riding Hood", the fourth pack 40-4 may be a pack having a film of the fairytale "The Town Musicians of Bremen", the fifth pack 40-5 may be a pack having a film of the fairytale "Snow White", and the sixth pack 40-6 may be a pack having a film of the fairytale "Goldilocks and the Three Bears".

The first pack 40-1 to the sixth pack 40-6 have uniquely-shaped discriminant grooves 430, respectively. As illustrated in FIG. 5a~5f, a first discriminant groove 430-1 is formed in the first pack 40-1, a second discriminant groove 430-2 is formed in the second pack 40-2, a third discriminant groove 430-3 is formed in the third pack 40-3, a fourth discriminant groove 430-4 is formed in the fourth pack 40-4, a fifth discriminant groove 430-5 is formed in the fifth pack 40-5, and a sixth discriminant groove 430-6 is formed in the sixth pack 40-6.

The first discriminant groove 430-1 to the sixth discriminant groove 430-6 are coupled to the discriminant protrusion module 23. The discriminant protrusion module 23 may be connected to the control module 300 such that the control module 300 generates a different pack discriminant signal according to a state in which the discriminant protrusion module is pressed by each of the discriminant groove 430-1 to 430-6.

Hereinafter, with reference to FIG. 6, a control module and a speaker module, a battery, and a drive module connected to the control module will be described as well as operation of each module.

Figure 6:
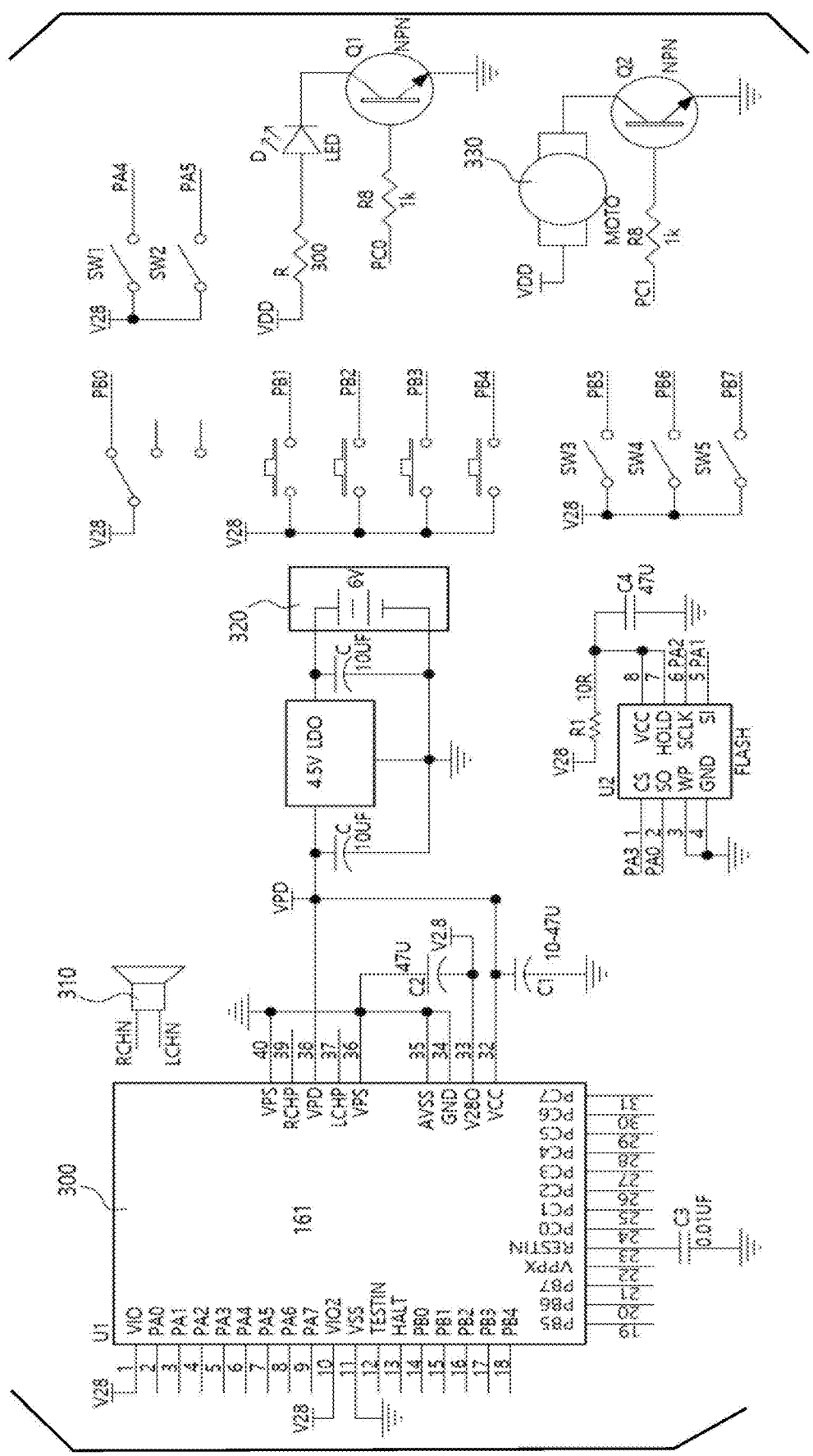
FIG. 6 is a circuit diagram illustrating a connected status of a speaker module, a battery, and a drive module connected to a control module formed in the body part illustrated in FIG. 1.

FIG. 6 is a circuit diagram illustrating a connected status of a speaker module, a battery, and a drive module connected to a control module formed in the body part illustrated in FIG. 1.

The control module 300 may be a Micro Controller Unit (MCU). The control module 300 is connected to the battery 320 and driven upon a supply of power from the battery 320.

The control module 300 includes a memory that stores a plurality of fairytales and a plurality of sound effects. The control module 300 is connected to the discriminant protrusion modules 23 and generates different pack discriminant signals in response to operations of the discriminant protrusion modules 23. In addition, in response to a pack discriminant signal, the control module 300 applies an electrical signal of data stored in the memory to the speaker module 310, such that a fairytale and a sound effect are output through the speaker module 310.

In response to pack discriminant signals, the control module 300 may output a story of a fairytale of a first pack and a sound effect thereof, a story of a fairytale of a second pack and a sound effect thereof, a story of a fairytale of a third pack and a sound effect thereof, a story of a fairytale of a fourth pack and a sound effect thereof, a story of a fairytale of a fifth pack and a sound effect thereof, and a story of a fairytale of a sixth pack and a sound effect thereof.

In addition, the MCU is connected to a plurality of fixing protrusion modules 22, and, when different fixing protrusion modules 22 are pressed by rotation of packs, the control module 300 outputs data of a fairytale of a pack in response to a pressed portion.

The control module 300 further include a Low Drop Out Voltage (LDO) module interposed between the control module 300 and the battery 320. The LDO module drops a voltage of power supplied from the battery 320, thereby stably applying the power to the control module 300. In response to application of the dropped voltage, the control module 300 may output a constant voltage.

Based on the output constant voltage, the control module 300 may apply an electrical signal of a constant level to a Light Emitting Diode (LED) connected thereto, a first NPN transistor Q1 connected to the LED, the drive module 330, a second NPN transistor Q2 connected to the drive module 330, the discriminant protrusion module 23, and the speaker module 310. In addition, the control module 300 may apply an electrical signal of a constant level to each device, thereby driving each device stably.

In particular, the drive module 330 may be driven at a constant speed in response to application of a constant voltage from the control module 300, thereby rotating the edge portion 410 of a pack.

Hereinafter, a usage status of the present invention will be described with reference to FIG. 7.

Figure 7:
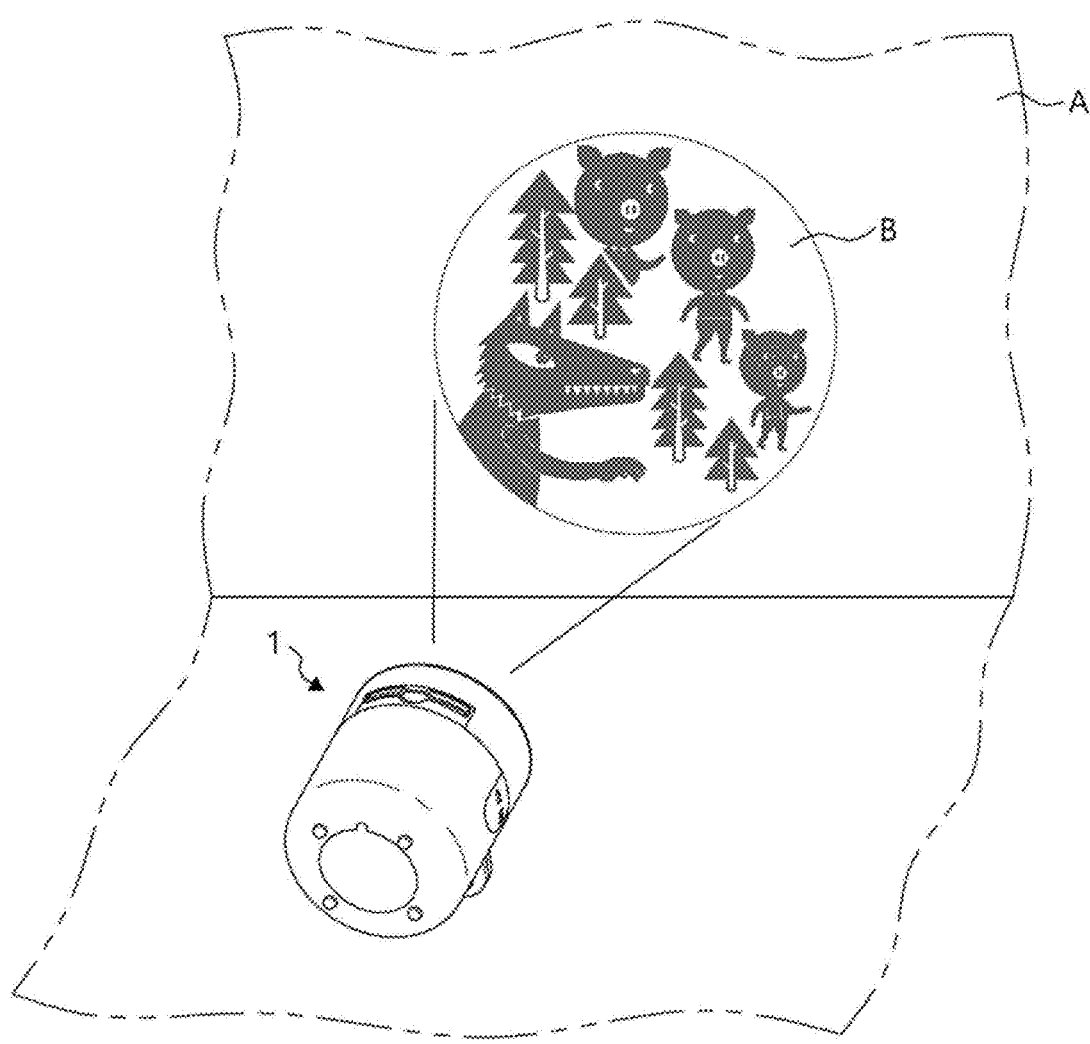
FIG. 7 is a diagram illustrating a usage status of a shadow fairytale projector according to an embodiment of the present invention.

FIG. 7 is a diagram illustrating a usage status of a shadow fairytale projector according to an embodiment of the present invention.

The shadow fairytale projector 1 may output a picture printed on the film 420 onto a wall A. For example, as illustrated in FIG. 7, the shadow fairytale projector 1 may be able to stand up at a predetermined angle relative to a floor by the first holding module 111 formed in the head part 10 and the second holding module 311 formed in the body part 30. The shadow fairytale projector 1 held on the floor may drive the first pack 40-1 inserted into the slit part 20 and output content of a fairytale contained in the first pack 40-1 to the wall A.

Such a shadow fairytale projector 1 outputs a film contained in the pack by emitting light not just to the wall A, but also to a ceiling and the like. In this case, the shadow fairytale projector 1 may output a shadow image to the wall, the ceiling, and the like within a range of 25 m at maximum.

In addition, in sync with an output image, the shadow fairytale projector 1 outputs sound realistically, for example, "The first little pig has built a straw house. Whooooo. The bad wolf blows air. Prrrr. The straw house is blown down."

The shadow fairytale projector 1 provides a child with a fairytale more realistically, such that the child is able to pay more attention to the story.

Although the exemplary embodiments of the inventive concept have been described with reference to the accompanying drawings, it will be understood by those skilled in the art to which the inventive concept pertains that the inventive concept can be carried out in other detailed forms without changing the technical spirits and essential features thereof. Therefore, the above-described embodiments are exemplary in all aspects, and should be construed not to be restrictive.

The shadow fairytale projector according to the present invention, once the power is on, automatically outputs a fairytale with shadow images and rhythmical sound, so that a child gives more attention to the fairytale. In addition, the shadow fairytale projector outputs sound such as onomatopoeia and mimetic words so that the child is able to feel the fairytale more realistically.

What is claimed is:

1. A shadow fairytale projector comprising:
a head part having a first lens module which protrudes from an outer side surface;
a slit part where a perforated hole overlapping with the first lens module is formed, and where at least one pack slit connected to the head part is formed on at least one side surface of the slit part, wherein the slit part comprises a first engagement rotation module for rotating a pack inserted into the pack slit and a film formed inside the pack, a fixing protrusion module for fixing the pack, and a discriminant protrusion module for determining a type of the pack; and
a body part which comprises a drive module connected to the first engagement rotation module to drive the first engagement rotation module, a control module coupled to the discriminant protrusion module to generate a pack discriminant signal and generate a sound signal in response to rotation of the drive module, a speaker module connected to the control module to receive the sound signal and generate sound, and a battery for applying electrical energy to the drive module, the control module, and the speaker module.

2. The shadow fairytale projector of claim 1, wherein the pack comprises a second pinion gear to be coupled to the first engagement rotation module, and the first engagement rotation module is a first pinion to be engaged with the second pinion gear.

3. The shadow fairytale projector of claim 1, wherein:
the pack has the discriminant groove formed in a plurality of shapes,
the discriminant protrusion module is connected to the control module and pressed by the discriminant groove, and
the control module generates different pack discriminant signals.

4. The shadow fairytale projector of claim 2, wherein the pack comprises a circular edge portion and a film attached to the edge portion, and a circumferential surface of the edge portion is formed as the second pinion.

5. The shadow fairytale projector of claim 1, wherein:
a fixing groove for housing the fixing protrusion module and a discriminant groove for housing the discriminant protrusion module are formed in one surface of the pack, and
the fixing groove has an upper end which is partially opened to expose the edge portion.

6. The shadow fairytale projector of claim 1, wherein the control module is connected to the fixing protrusion module, the discriminant protrusion module, and the drive module so as to drive the drive module by generating different electrical signals in response to operations of the fixing protrusion module and the discriminant protrusion module, computing the different electrical signals, and applying the computed electrical signals to the drive module.

\* \* \* \* \*